Jan. 10, 1967  A. M. MARKS  3,297,887
HEAT ELECTRICAL POWER TRANSDUCER
Filed June 3, 1963  7 Sheets-Sheet 1
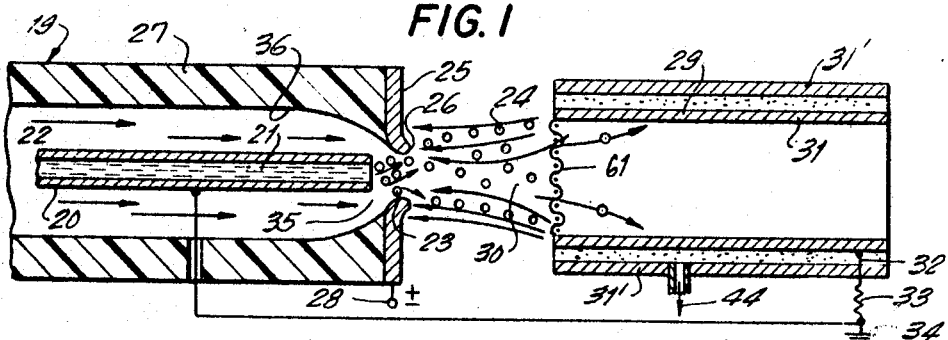
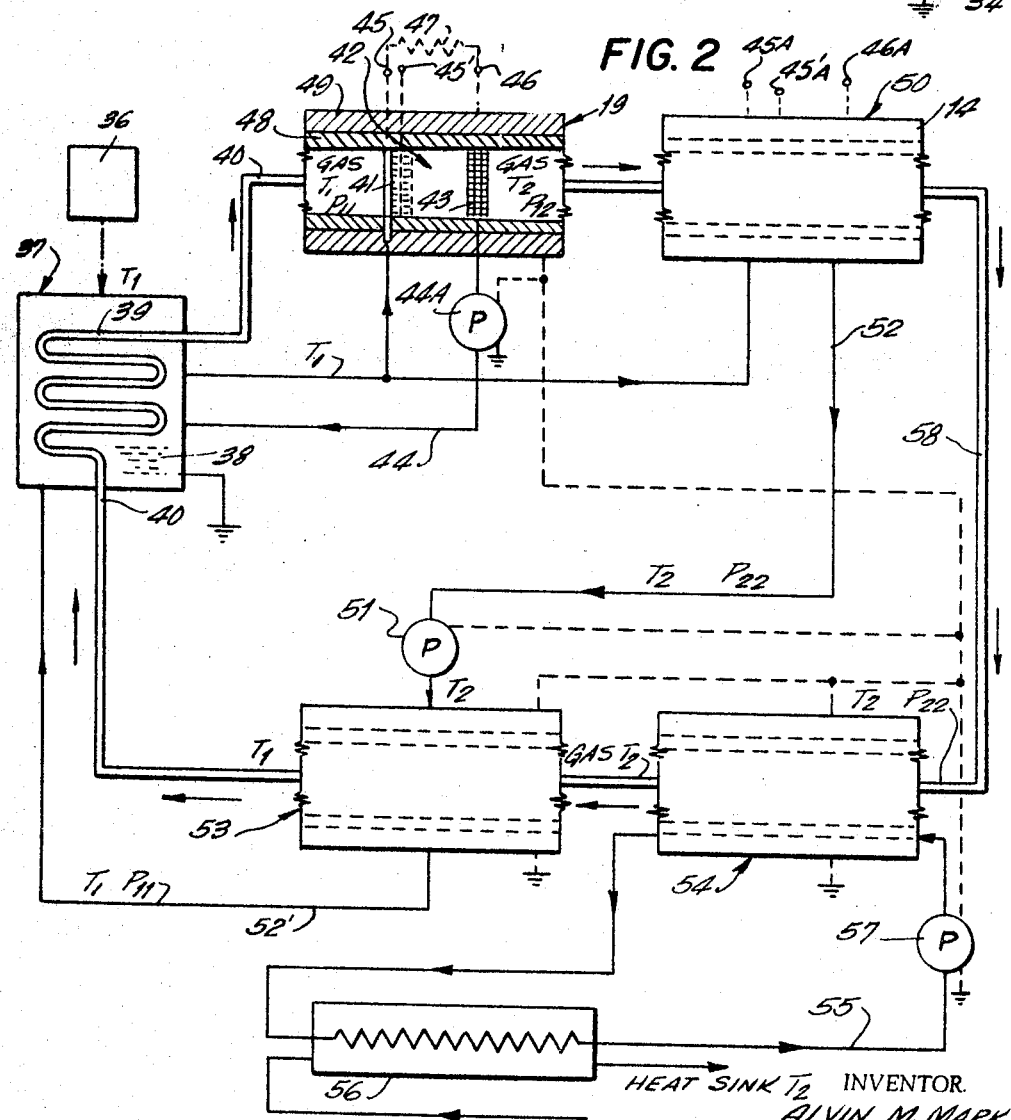
HEAT SINK $T_2$
AMBIENT TEMP.
INVENTOR.
ALVIN M. MARKS
BY Albert F. Kronman
ATTORNEY MODE RATIO, ω, VERSUS TEMPERATURE RATIO, τ FOR CONSTANT OVERALL PRESSURE RATIO, π AND CONSTANT REAL CARNOT EFFICIENCY η'c
USING ε = 0.05

United States Patent Office 3,297,887
Patented Jan. 10, 1967

3,297,887
HEAT ELECTRICAL POWER TRANSDUCER
Alvin M. Marks, 149—61 Powells Cove Blvd.,
Whitestone, N.Y. 11357
Filed June 3, 1963, Ser. No. 284,897
17 Claims. (Cl. 310—4)

This invention relates to electrothermodynamic devices for converting thermal and kinetic power to electrical power and more particularly it is concerned with an electrothermodynamic device employing a charged aerosol for effecting such conversion efficiently.

According to the second law of thermodynamics the complete conversion of thermal energy into work by a cyclic process can be accomplished only by a non-realizable condition in which an ideal gas is subjected to a series of reversible changes in which heat and work are interconverted. Since the conditions of ideality and reversibility cannot be attained in a practical way, it has been the object of considerable research to provide thermodynamic media in which operation most closely approximates the idealized system.

Devices embodying a novel electrothermodynamic cycle employing a charged aerosol as a working medium for the efficient conversion of thermal power to electrical power are described herein. The electrically charged aerosol is a working medium of predetermined composition. The aerosol is simultaneously formed and charged within a stream of rapidly moving gas and subsequently discharged at a collector, thereby converting the heat and kinetic power of the charged aerosol gas into electrical power.

By way of illustration, a Carnot cycle operating with a charged aerosol as the working medium is described.

In the isothermal phases of the cycle, the electrothermodynamic device of the present invention utilizes an electrically charged aerosol having a large ratio of liquid mass to gas mass.

Heat power may be injected isothermally into the charged aerosol gas while electrical power is being extracted.

In the adiabatic phases of the cycle, the electrothermodynamic device of this invention utilizes an electrically charged aerosol gas having a small ratio of liquid mass to gas mass.

In the isothermal and adiabatic cases the charge density of the charged aerosol may be of the same order of magnitude. The charge density required in either case may be obtained by regulating the charge to mass ratio of the charged particles, and their number per unit volume.

In this invention the liquid component of the aerosol is utilized as a means of heat power injection into a loop, as a means of transfer of heat power between loops, and as a means for the expulsion of heat power to a low temperature heat sink.

Accordingly, it is an object of the present invention to provide an electrothermodynamic device utilizing a charged aerosol as a working medium.

Another object of the instant invention is to provide an electrothermodynamic device in which a charged aerosol of predetermined composition undergoes an expansion during which heat power is converted into electrical power.

A further object of this invention is to provide efficient power conversion through the heat interchange of the highly dispersed liquid and gas components of an aerosol.

An object herein is to provide a Carnot cycle engine in which varying the ratio of liquid mass to gas mass of a charged aerosol controls the modes of isothermal and adiabatic expansion, and isothermal and adiabatic compression stages of the cycle.

An object of the invention is the determination of the operational parameters per loop of a charged aerosol electrothermodynamic cycle to obtain a maximum conversion of thermal power to electrical power within predetermined operational limits.

A feature of the present invention is its use of the highly dispersed liquid component of a charged aerosol as a heat source and as a heat sink within the working substance during the isothermal stages of a single electrothermodynamic loop. The consolidated liquid component of the aerosol is also used for the transport of heat into and out of a loop, and for the transport of heat between the loops of a device employing multiloop cycles.

A further feature of the invention is the conversion of heat power into electrical power by isothermal expansion of a charged aerosol having a large ratio of liquid mass to gas mass.

Another feature of the invention is the conversion of heat power into electrical power by adiabatic expansion of a charged aerosol having a small ratio of liquid mass to gas mass.

A further feature of the invention is the conversion of electric power into heat power by the isothermal compression of a charged aerosol having a large ratio of liquid mass to gas mass.

A further feature of this invention is the conversion of electric power into heat power by the adiabatic compression of a charged aerosol by having a small ratio of liquid mass to gas mass.

A feature of the present invention is the use of a charged aerosol as a pump for compressing a gas during the compression phases of a Carnot cycle.

Another feature of this invention is its multiloop electrothermodynamic process to limit compression ratios in which the heat power is conveyed between loops by the liquid component consolidated from the liquid component of the charged aerosol.

The ideal Carnot cycle results in the theoretically maximum attainable useful power output according to the laws of thermodynamics. The charged aerosol constitutes a unique working substance in an electrothermodynamic system. The electrothermodynamic cycle operating in this manner is reversible and approaches an ideal Carnot cycle. This cycle is without moving parts except for the gas and liquid components.

Isothermal or adiabatic expansions are accompanied by the extraction of electrical power while isothermal or adiabatic compresisons are accompanied by the input of electrical power. The electrical power output minus the electrical power input will equal the heat power input times the Carnot efficiency for this cycle.

These operations are conventional as to the Carnot cycle, but the achievement of an electrothermodynamic Carnot cycle employing a charged aerosol for the conversion of a heat power input to an electrical power output, is set forth herein.

The invention consists of the construction, combination and arrangements of parts, and the steps of the method herein illustrated, described and claimed.

In the accompanying drawings forming part hereof are illustrated several embodiments of the invention in which similar reference characters designate corresponding parts and in which:

FIGURE 1 is a somewhat diagrammatic view in longitudinal section of an aerosol power conversion device to illustrate the "electrojet principle" which may be advantageously employed in the electrothermodynamic system of the present invention.

FIGURE 2 is a schematic illustration in partial section of a single loop operating according to an electrothermodynamic Carnot cycle, in which a charged aerosol is the working substance.

Figure 3:
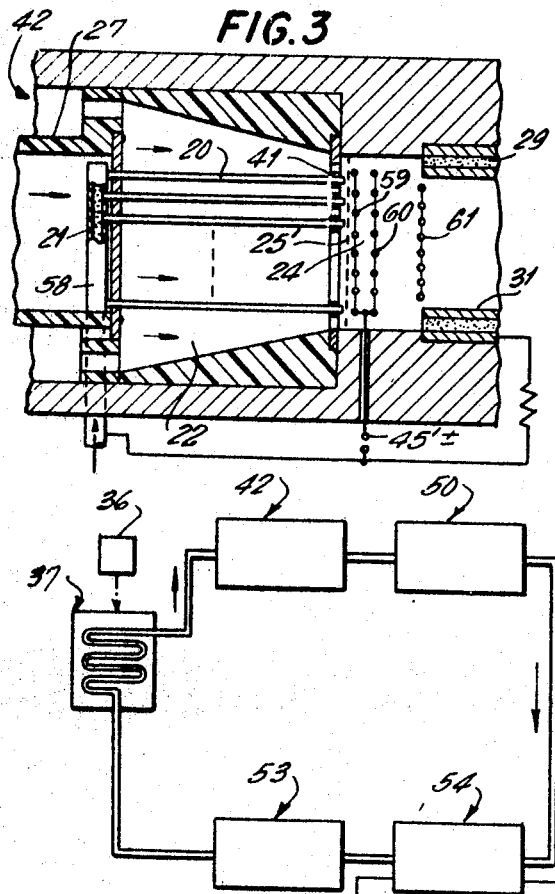
FIGURE 3 shows an enlarged detailed view of the aerosol generator shown in FIGURE 2.

As used herein, the term "electrojet" principle means projecting a stream of liquid and simultaneously subjecting it to mechanical and electrical forces to create a charged aerosol of minute particles.

Referring now to the drawings and more particularly to FIGURE 1 thereof, there is shown, somewhat diagrammatically, a charged aerosol generator 19 embodying the "electrojet" principle which simultaneously forms and charges an aerosol to provide a controlled working medium for use in an electrothermodynamic cycle according to the present invention.

As shown in FIGURES 1 to 3, the aerosol is simultaneously formed and charged by forcing a liquid 21 under pressure through and out of one or more small capillaries or tubes 20 placed in a moving gas stream 22, and applying a high potential to the capillary tip or directly to the liquid charged droplets which explode and form many smaller droplets due to the mutual repulsion of elementary areas of their charged surfaces. The charged aerosol provides a space charge field against which the gas does work. The charged aerosol is subsequently discharged by a collector electrode 31 after having reached a high potential in a space charge field, thus transferring the internal heat power and kinetic power of the gas to electric power, which is fed to an external circuit.

In a single capillary generator embodiment of FIGURE 1 there is shown a charging ring 25 formed with a central nozzle 26 of an electrically conducting material. The nozzle 26 confines and transports the charged droplets 23 of the aerosol in a concentrated stream away from the capillary 20.

The capillary 20 is mounted within gas conduit 27 formed of a dielectric material. The charging ring 25 is secured to the front of conduit 27 and a short distance from the end of the capillary 20.

A difference of potential is applied between the charging ring 25 and the capillary 20. The source of potential is preferably connected to the charging ring 25 with the capillary 20 grounded at 34. The nozzle 26 directs the aerosol 24 through a conversion space 30 and into the collector electrode 31. The collector electrode is cylindrical in shape and open at both ends.

As the droplets 23 of the charged aerosol leave the capillary 20 they pass through a space 35 between the end of the capillary 20 and the end of the charging ring nozzle 26. The accelerating electric field in the space 35 assists the droplets to accelerate to the gas velocity.

The projecting nozzle 26 of the charging ring 25 provides a field free section which acts as a shield against the reverse field within the conversion space 30, which reverse field would otherwise interfere with the formation and charging of the aerosol in space 35. The droplets 23 diverge within the collector electrode 31, as indicated by the arrows, due to mutual repulsion. The droplets 23 discharge upon the collector walls permitting the gas to flow through the collector electrode 31 without obstruction. The loss in kinetic power of the gas is transduced into electrical power in the conversion space 30 between the charging ring 25 and the collector 31. The electric power is applied between lead 32 and ground 34 across an external load 33.

In accordance with the present invention, a charged aerosol may be utilized as a working substance in an electrothermodynamic cycle, such as a Carnot cycle, for converting thermal power into electrical power. In general, the charged aerosol enters the generator at zero electrical potential at a temperature $T_1$, pressure $P_1$ and velocity $V_1$. The drag of the moving gas carries the charged particles to a charge collector maintained at a potential E. At the collector substantially all of the aerosol particles are electrically discharged. This process is repeated through successive stages of aerosol generation and collection until a proportion of the thermal power is converted to electrical power which is fed to an external load. The gas then emerges from the generator at $T_2$, $P_2$ and $V_2$.

In the embodiment illustrated in FIGURES 2 and 3, the charged aerosol generator 41 includes a plurality of capillary tubes 20 through which a suitable liquid 21 is forced under pressure by one or more tubes 58. An electrically conducting path is thereupon established through the liquid 21 either directly or by way of the capillary tubes 20. A stream of gas 22 is diverted through a conduit 27 around the capillary tubes 20 at a suitable velocity in the direction indicated by the arrows. Charged droplets 23 then form on the end of capillaries 20 under the intense electric field and the acceleration forces of the gas. As the droplets enter the gas 22 they explode into many smaller droplets by the mutual repulsion of elementary areas of their charged surfaces, forming the charged aerosol indicated at 24. A charging electrode 25' is disposed in the path of the charged aerosol 24. Spaced wire grids 59 and 60, which are maintained at the same potential by being interconnected as shown in FIGURE 3, are positioned between the capillaries 20 and the collector electrode 31. A region which is field free except for space charge is thus created between the grids 59, 60. A collector screen 61 of spaced electrically conductive wires is secured to the front end of the collector electrode 31.

Figure 4:
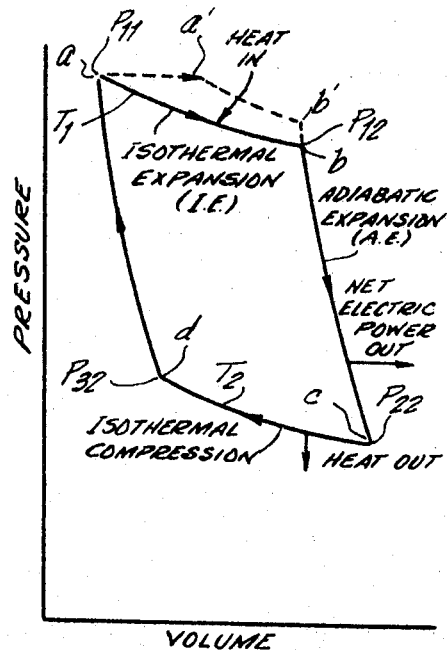
FIGURE 4 is a graphical representation of the pressure volume changes which the system of FIGURE 2 undergoes during each stage of operation.

An electrothermodynamic system according to the present invention, utilizing a charged aerosol and operating in a Carnot cycle is illustrated in FIGURES 2 and 4. FIGURE 2 shows schematically the operation of a single loop of an electrothermodynamic Carnot cycle. FIGURE 4 graphically depicts the pressure-volume changes accompanying the various stages of the cycle.

Referring now more particularly to FIGURE 2, there is shown a heat source 36 which supplies heat to the heat exchanger 37. The heat exchanger 37 contains a liquid 38 and pipes 39 through which flows a compressed gas 40. In FIGURE 2 the liquid flow is indicated by single lines, the gas flow by double lines, and electrical power by dashed lines.

The liquid 38 and compressed gas 40 enter the aerosol formation and charging device 41 of the isothermal stage of the charged aerosol generator generally referred to in FIGURE 2 by number 42. At the injection point into the aerosol generator 42, the liquid 38 and gas 40 are both at the same temperature $T_1$ and pressure $P_{11}$; this is point "a" on the diagram of FIGURE 4.

The charging and forming device described above, produces an intimate mixture of gas and fluid droplets resulting in a large interfacial area between the highly interspersed liquid and gas components of the aerosol. Consequently heat is rapidly and efficiently interchanged between the liquid and gaseous components of the aerosol. If the ratio of liquid mass to gas mass of the charged aerosol is adjusted to a large value, most of the internal heat energy of the charged aerosol will reside in the liquid component. Under theser circumstances heat may readily be transferred substantially isothermally from the liquid component of the charged aerosol to the gas. Conversely, when the ratio of liquid mass to gas mass is small, most of the internal energy of the charged aerosol resides in the gas component. Under these circumstances an adiabatic expansion or compression of the gaseous component of the charged aerosol occurs.

Figure 9:
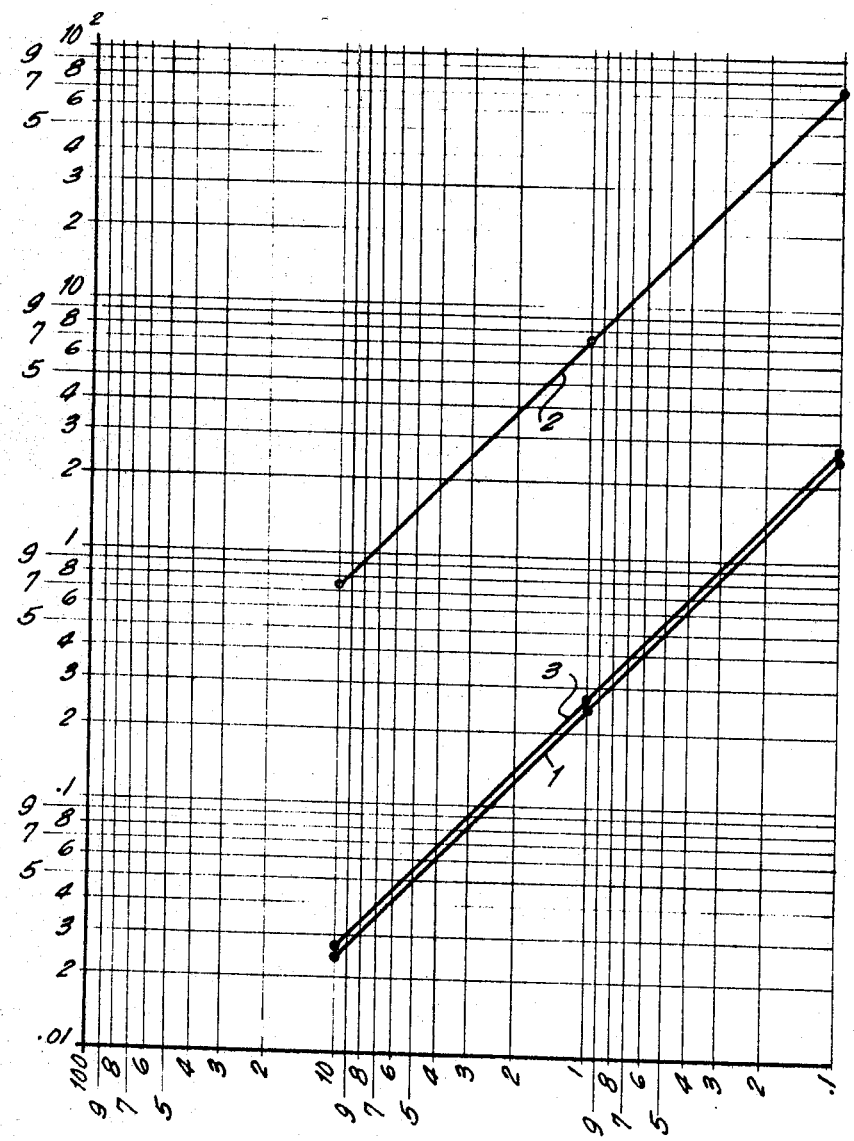
FIGURE 9 is a graph of values of $\overline{H}$, the ratio of specific heats of the gas compared to the aerosol liquid, versus the ratio of the mass of liquid to the mass of gas, $\overline{R}$, at standard temperature and pressure for various aerosols.
Figure 10:
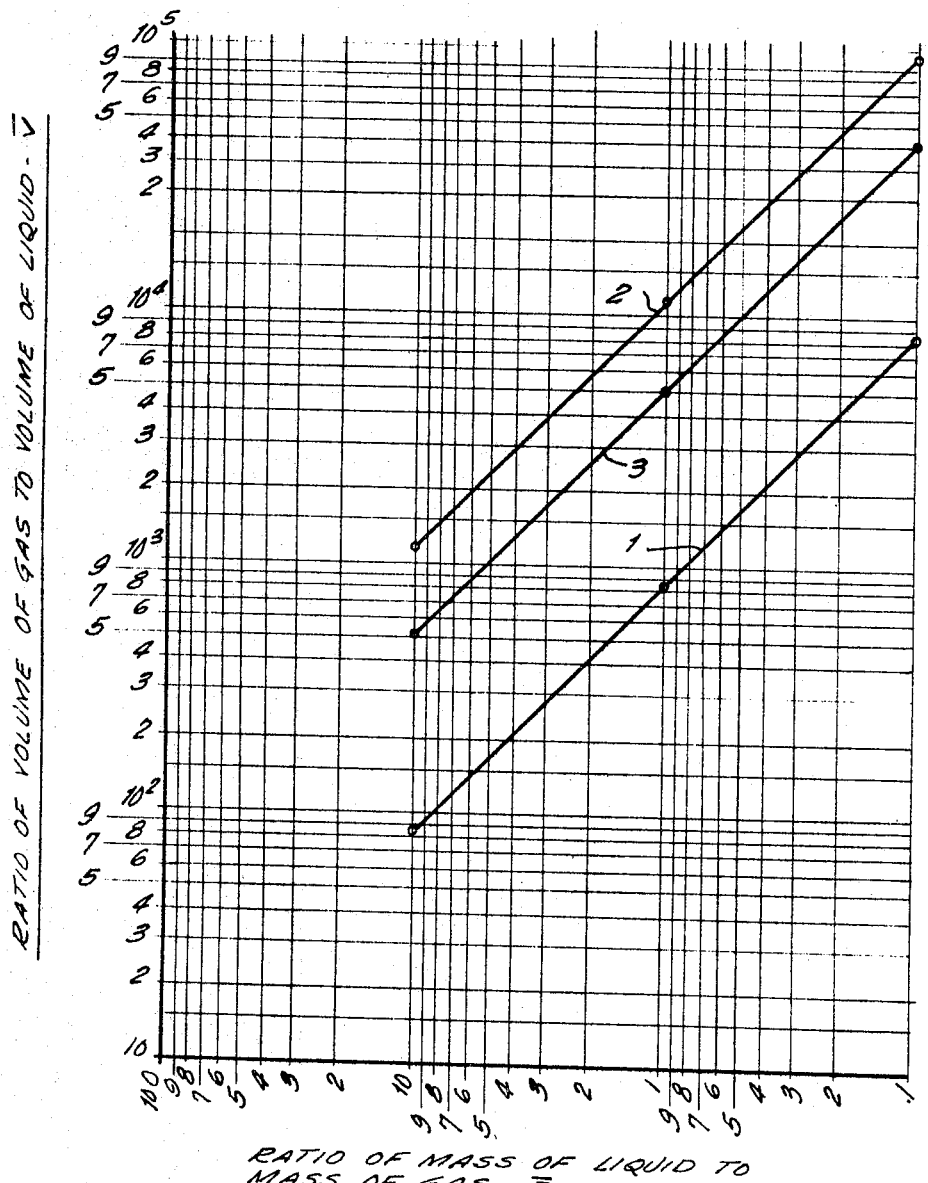
FIGURE 10 is another graph in which is plotted values of ratio of volume of gas to volume of liquid, $\overline{V}$, versus the ratio of the mass of the liquid to the mass of the gas, $\overline{R}$, at standard temperature and pressure for various aerosols.

FIGURES 9 and 10 show that for an isothermal operation the ratio of the liquid mass to the gas mass of the charged aerosol may be of the order of 10 while for an adiabatic operation this ratio may be of the order of 0.01. For isothermal operation, ratios of the volume of gas to the volume of liquid of the charged aerosol will vary from 50 to 1500 times, while for adiabatic operation, this ratio will exceed $10^4$ times.

The charge density of the aerosol may however, be maintained at approximately the same maximum value during the isothermal and adiabatic portions of the cycle. The charge density in both cases is limited only by the electric breakdown of the gas as will be apparent from the subsequent mathematical physics section. The mass of the charged aerosol liquid droplets per unit volume, however, will vary in accordance with the requirement for establishing a condition of isothermal or adiabatic behavior. This may be accomplished by varying the ratio of mass to charge of the droplet, by varying the number of droplets per unit volume, or both.

FIGURE 4 shows a pressure volume diagram of a single cycle or single loop operating as an electrothermodynamic device performing an essential ideal gas Carnot cycle. Substantially isothermal expansion occurs along the line $ab$, adiabatic expansion along line $bd$; isothermal compression (pumping) along line $cd$, and adiabatic compression (pumping) along lines $da$. Electrical power is extracted during the operation of phases $ab$ and $bc$ of the cycle, and electrical power is fed in during pumping phases $cd$ and $da$.

The difference between electrical power extracted and fed into the cycle comprises the net electrical power output.

During the expansion $ab$, as the pressure decreases and the volume of the gas increases, the tendency of the gas is to drop in temperature. However, isothermal (constant temperature) operation is achieved because most of the heat content of the charged aerosol resides in the interspersed liquid component which acts as an internal heat source at the same temperature as the gas. The charged aerosol gas thus drops only slightly in temperature as electric power is withdrawn. Consequently, as heat power is withdrawn from the liquid component of the expanding charged aerosol it is directly converted to electrical power, and only a small temperature drop occurs between points $a$ and $b$. The expansion thus occurring, is substantially an isothermal operation.

The line $ab$ is representative of the isothermal expansion of an ideal gas. However, under actual conditions, various other processes may occur which may cause a deviation from the ideal isothermal line $ab$, such as: partial evaporation of droplets comprising the liquid component of a charged aerosol or an increase in volume due to the injection of the charged aerosol liquid component. Thus an operation of the cycle at the point of injection might be represented by an increase in volume at constant pressure and represented by the curve $aa'$. During the modified cycle, the isothermal line is now shifted to $a'b'$.

This variation in the cycle is shown to illustrate a possible modification of the basic cycle which still falls within the scope of this invention.

After the isothermal phases of the cycle at points $b$ and $d$, and before performing the adiabatic expansion following $b$ or $b'$, or the adiabatic compression following $d$, the liquid component of the aerosol is electrically discharged, consolidated, and removed from the gas as a body of liquid. Subsequently a smaller proportion of charged aerosol liquid is added to the gas during the adiabatic phases of the cycle.

The charged aerosol tends to remain in the dispersed phase during the short time required for its formation and charging, power conversion and charge collection.

However, after aerosol liquid droplets are discharged rapid coalescence of the droplets occurs, forming larger droplets. These larger droplets then settle out, thus consolidating dispersed aerosol droplets into a larger body of liquid 44.

In accomplishing the consolidation and removal of the liquid component of the charged aerosol, various methods may be employed.

One method is to cause the electrically discharged aerosol gas from which the kinetic power has been substantially extracted as electrical power, to enter a space of large volume, where it remains for a time sufficient to coalesce and separate out by gravity.

Other known techniques may be employed to separate the droplets from the gas. One method is to give a whirling action to the gas whereby centrifugal force drives the droplets to the wall of the chamber. The wall of the chamber may comprise a sintered metal or ceramic 29 which is porous and which may be maintained at a slightly reduced pressure so that the liquid will be constantly absorbed into the walls and emerge on the other side of the wall for re-use.

Still another method which may be employed is to simultaneously discharge and collect the aerosol droplets. In this method the aerosol droplets are driven to the wall by electrical forces where they are absorbed by the porous structure 29.

Referring now to FIGURE 4, the complete cycle $abcd$, operating as an ideal Carnot cycle, results in an extraction of electrical power during the isothermal expansion $ab$ and the adiabatic expansion $bc$.

A portion of the electrical power may be fed into the cycle during isothermal compression from points $c$ to $d$ and during adiabatic compression from points $d$ to $a$.

During compression portions of the cycle $cd$ and $da$, power may be fed into the conversion space 30 of the isothermal and adiabatic compressors so as to cause the charged aerosol droplets 23 to transduce the input electrical power and thus to cause a compression of the gas to occur.

During the adiabatic portions of the cycle, which comprise an expansion between points $b$ and $c$ and a compression between points $d$ and $a$, the liquid content of the charged aerosol must be present in such small proportion as to not contribute substantially to the heat content of the gas. The ratio of liquid mass to gas mass favoring adiabatic operation, may be of the order of .01.

During isothermal portions of the cycle which comprise an expansion between points $a$ and $b$ and a compression between points $c$ and $d$, the ratio of liquid mass to gas mass is large; that is, it may be of the order of 10.

Thus it may be seen that the charged aerosol constitutes an electrothermodynamic working medium whose composition may be selected so as to produce either an isothermal or adiabatic operation during expansion or compression, by controlling the ratio of liquid mass to gas mass, while the charge density remains relatively unchanged.

Alternatively mechanical pumping and conventional heat exchangers may be employed in certain portions of the cycle without departing from the scope of this invention.

Returning now to the schematic illustration of a single loop operating according to an electrothermodynamic Carnot cycle shown in FIGURE 2, and specifically to the isothermal section thereof, the liquid 38 travels from the aerosol formation and charging device 41 through the conversion space 42, to the collector electrode 43 and then back to the heat exchanger 37, along pipe line 44, under essentially isothermal conditions. The heat source 36 supplies heat at a constant high temperature $T_1$ to the heat exchanger 37.

While this is occurring electrical power is being extracted between the aerosol formation and charging device 41 and collector 43, via the terminals 45 and 46 respectively, and supplied to the load 47. A high intensity electric field is applied to the liquid component across terminals 45 and 45' as it enters the aerosol charging device 41 in the presence of a gas stream at a velocity of 0.3–1.0 Mach. As a result of the applied electrical and mechanical forces the liquid drops are broken up into charged droplets of submicron radius which are then carried by the flowing gas stream toward the liquid charge collector electrode 43.

The high pressure-high temperature aerosol generator device is contained within an insulated chamber 48, which is carried within a sufficiently thick metal shell 49.

The internal high temperature region of the aerosol generator does not penetrate the insulated chamber 48 to the shell 49, and thus the very high internal temperatures and pressures can be withstood by an external shell of a conventional material operating at a lower temperature.

In the adiabatic charged aerosol converter indicated at 50 in FIGURE 2, a temperature differential of the cycle $\Delta T = (T_1 - T_2)$ is established in the adiabatic expansion portion of the cycle between $b$ and $c$ while electric power is supplied to the external load at terminals 45A, 46A.

The adiabatic aerosol charging and formation device in converter 50 is similar in construction to that of the aerosol formation and charging device at the isothermal section of the converter, except that the ratio of liquid mass to gas mass is kept small by reducing the amount of liquid input relative to that of the gas. A larger applied electric intensity results in smaller droplets having a greater charge to mass ratio. The orifices of the capillaries are smaller in diameter, of the order of .01 to .1 mm.

When a metal is used as the liquid an electromagnetic pump 51 is utilized to pump the liquid metal back into the reservoir of the heat exchanger 37. A conventional liquid pump may also be used.

After the liquid is discharged within the converter 50 it is collected by line 52. At this stage it is at the low temperature $T_2$ and the low pressure $P_{22}$, whereupon it is pumped by the auxiliary pump 51, back through an adiabatic compressor 53 where it is converted to a charged aerosol. The charged aerosol is compressed to temperature $T_1$. After the charged aerosol has been discharged within the isothermal compressor 53, the liquid component of the discharged aerosol, now at temperature $T_1$, is separated, consolidated at the increased pressure $P_{11}$, and carried to the heat exchanger 37 via line 52'.

While conventional compressors may be used for the isothermal and adiabatic compression stages of the Carnot cycle, it is preferred to utilize the aerosol generator principle in reverse as charged aerosol compressors 53 and 54, the former for adiabatic compression and the latter for isothermal compression.

In the operation of the charged aerosol power conversion device in reverse as a compressor, an accelerating instead of a decelerating potential is applied to the collector electrode 43.

The isothermal compressor 54 receives a liquid from the pipe 55, which is connected to the heat sink 56. The liquid is injected into the isothermal charged aerosol compressor 54 by a liquid pump 57.

The gas from the adiabatic expansion continues along the pipe 58 at the low temperature $T_2$ and the low pressure $P_{22}$ into the isothermal charged aerosol compressor 54. Under these circumstances a large ratio of liquid mass to gas mass produces an isothermal compression. As the isothermal compression proceeds, the gas component of the aerosol gives up its heat to the liquid component of the aerosol in the compressor 54. The liquid component which is then at temperature slightly exceeding $T_2$, is circulated by the liquid pump 57, through the heat exchanger 56. The heat exchanger 56 disposes of the waste heat at the low temperature $T_2$, to "heat sink" 56, such as ambient atmospheric air, water, or radiation into space.

A gas having a small ratio of liquid mass to gas mass proceeds through a similar preferably charged aerosol electrothermodynamic compressor 53, operating adiabatically, and finally enters the heat exchanger 37 at high temperature $T_1$ and the high pressure $P_{11}$.

The input electric power to the terminals 45 and 45' for the formation and charging of the aerosol is a small fraction of output power from the cycle.

Figure 5:
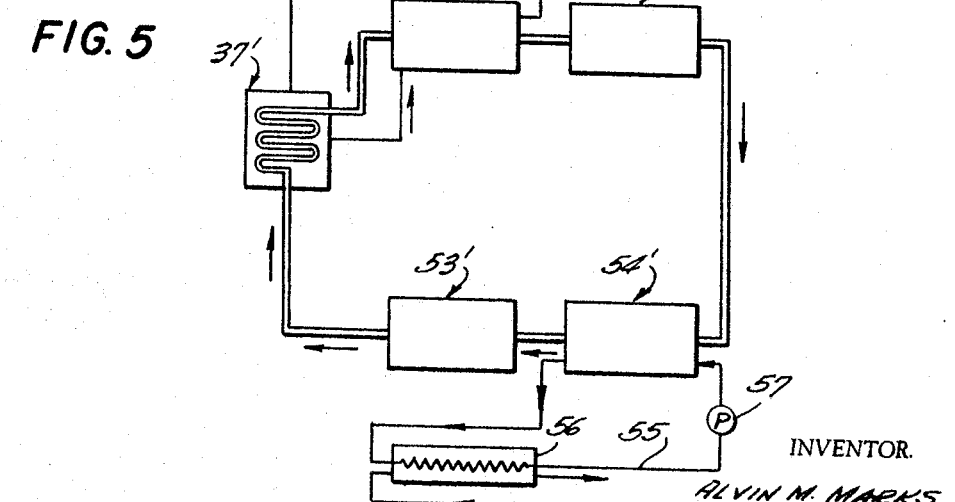
FIGURE 5 is a diagrammatic illustration of a two-loop electrothermodynamic Carnot cycle system in accordance with the invention.

Referring now to FIGURE 5, there is shown schematically a charged aerosol generator operating on a multiloop Carnot cycle. A two loop cycle is shown wherein the heat is transferred isothermally from the aerosol of one loop to the aerosol of another loop by means of the liquid components. The liquid rejected at the low temperature stage of a loop at the isothermal compressor 54 is introduced directly into the second loop by the transfer of liquid component from the charged aerosol of one loop to the isothermal charged aerosol expansion device 42' of the other loop through liquid reservoir 37'. This process eliminates the necessity for a conventional heat exchanger.

The operational parameters which affect the efficiency of the electrothermodynamic cycle are the initial and final temperatures, the ratio of heat input to adiabatic work output, and the fractional energy loss during the cycle working pressures, and the number of loops in the system.

High efficiencies are achieved with the charged aerosol starting at a high initial temperature and pressure and a low final pressure and temperature in a multiloop Carnot cycle. Utilizing a one loop cycle, efficiency may be of the order of 50%, with a two-loop cycle, 60%, and with a three or four loop cycle, 70% or 80%.

Safe maximum operating temperatures and pressures for available materials are limited by the input temperatures and pressures of the electrothermodynamic system of the present invention. A lower limit on pressure at any given temperature is the requirement that the gas density at a given temperature be high enough to support as large an electric power density as possible without exceeding the electrical breakdown characteristics of the charged aerosol gas.

The overall pressure ratio per cycle may be kept within operating limits by choice of an appropriate temperature ratio per cycle, and by the use of multiloop cycles, to enable as high a temperature input as possible and as low a temperature sink as possible.

For a given cycle to produce a net power output, it is necessary that the ratio, $w$, of the heat energy input isothermally at $T_1$ to the work energy output during adiabatic expansion should be kept high. Practical values of $w$ are between 1 and 2. Below 1 the cycle efficiency decreases substantially while above 2 the cycle efficiency does not increase appreciably. The converted electric power density, $\rho$, is proportional to the square of relative gas density ($\rho_A^2$) and the square of the relative electrical breakdown factor ($K^2$) where: $1 < K < 3$. The relative gas density is directly proportional to absolute pressure, and inversely proportional to absolute temperature. Depending on the values of $\rho_A$ and $K$, the power density will thus vary from 0.1 to 200 megawatts/m.$^3$.

The aerosol droplets have a vapor pressure which is present as a gas intermixed with the carrier gas. If this gas is supercooled during the conversion by extracting power from the gas and causing the gas to expand, the tendency is to condense the gas into a liquid forming droplets about any ions which may be present. Breakdown is prevented because the ions cannot move in the aerosol. This condensation has been observed to occur even when the liquid vapor of the aerosol is not supersaturated.

Some illustrative aerosol working substances include the following: water-air; water-steam; and gallium-nitrogen, the latter operating between temperatures of 1525° K. and 305° K. ambient temperature.

As described, there is a change in pressure of the aerosol gas during the expansion and compression stages of the electrothermodynamic cycle. In one system embodiment the velocity of the gas component of the aerosol which circulates through the cycle remains constant within limits. The desired constancy is achieved by adjusting the ratio of the inlet and outlet cross-sectional areas of the charged aerosol power conversion spaces. During an expansion stage when the gas pressure is reduced, the diameter of the outlet space is made greater than the inlet diameter. For compression stages, when the gas pressure is increased, the inlet to outlet diameter is decreased in a similar ratio.

The mathematical-physics, or the relations governing electrothermodynamic laws involved, are presented hereinafter.

In the conversion of thermal to electrical energy by a charged aerosol, it is initially assumed that there are no wasteful dissipative mechanisms in the system, such as:

(1) Mechanical losses (a) Wall friction or turbulence.
(b) Slip of the aerosol droplets relative to the gas due to the electrical field.

(2) Electrical losses occurring during (a) Droplet charging
(b) Droplet discharging.

Subsequently in this analysis these losses are taken into account to predict the behavior of "real" systems.

With the information obtained from the calculation of the behavior of an "ideal" no-loss converter, parameters are obtained which are useful guides to the design of a "real" generator.

I. TABLE OF SYMBOLS (1) MKS units, and ° K. gram-cal. thermal units, are used.

(2) "Standard Conditions" are defined at 300° K. and $10^5$ newtons/m.$^2$. 1 atmosphere=$1.01\times10^5$ newtons/m.$^2$.

$A$=cross-sectional area of conversion space.
$A_1$=inlet area to conversion space.
$A_2$=outlet area of conversion space.
$b_g$=ratio of the electric breakdown potential of a given gas compared to that of air, at standard conditions; or "relative electric breakdown gas factor."
$b_0$=intensity of electric field for spark breakdown for air under standard conditions=$3.08\times10^6$ volts/m.
$C$=sonic velocity at temperature T.
$C_0$=sonic velocity under standard conditions=347 m./sec.
$C_1$=sonic velocity at temperature $T_1$.
$C_2$=sonic velocity at temperature $T_2$.
$c_L$=specific heat of the liquid component of the charged aerosol.
$c_P$=specific heat at constant pressure for the gas component of a charged aerosol.
$c_V$=specific heat at constant volume of the gas component of a charged aerosol.
$\delta$=density of the gas component of a charged aerosol gas in kg./m$^3$.
$\delta_0$=density of air under standard conditions=1.163 kg./m.$^3$.
$\delta_a$=relative gas density at relative temperature $T_a$ and relative pressure $P_a$ compared to the same gas density under standard conditions.
$\delta_G$=density of the gas component of the charged aerosol gas.
$\delta_L$=density of the liquid component of the charged aerosol gas.
$E_m$=maximum electric intensity in the conversion space at which electric spark breakdown occurs.
$e$=electronic charge=$1.60\times10^{-19}$ coulombs.
$\epsilon$=fractional loss throughout cycle.
$\epsilon_0$=permitivity of free space=$8.85\times10^{-12}$ farads/m.
$f$=packing factor.
$\gamma$=ratio of specific heats of the gas comprising the charged aerosol working medium=$c_p/c_v$.
$H$=heat content of a mass in the charged aerosol.
$\overline{H}$=variational specific heat ratio ($dH_G/dH_L$) is defined for a differential change in temperature $\Delta T$ of a unit volume of charged aerosol, as the ratio of "change of heat content of the gas component ($dH_G$)," to the "change of heat content of the liquid component ($dH_L$)," in which the gas and liquid component exist in a ratio $\overline{R}$.
$H_G$=heat content of the gas component of the charged aerosol of a mass $m_G$.
$H_L$=heat content of the liquid component of the charged aerosol of a mass $m_L$—cals./° K.-kg.
$h$=enthalpy of gas, per unit mass—cals./° K.-kg.
$j$=current density amps./m.$^2$.
$k$=ratio of the electric breakdown potential of "a gas with a charged aerosol under a given particle concentration, radii, charge and velocity," compared to that of "the gas only," at the same density; or "relative electric breakdown aerosol factor."
$L$=length of conversion space—meters.
$\dot{M}$=mass rate of flow—kg./sec.—m.$^2$.
$\overline{M}_1$=Mach number at velocity $U_1$ and temperature $T_1$.
$\overline{M}_2$=Mach number at velocity $U_2$ and temperature $T_2$.
$m$=mass—kg.
$m_G$=mass of the gas component of the charged aerosol—kg.
$m_L$=mass of the liquid component of the charged aerosol—kg.
$m_r$=relative average molecular (or atomic) weight compared to that of air.
$\eta_C$=Carnot efficiency, ideal.
$\eta_C'$=Carnot efficiency of a real cycle including losses.
$P$=pressure—newtons/m.$^2$.
$P_1$=initial pressure during isentropic expansion. Initial pressure when entering conversion space.
$P_2$=final pressure after leaving conversion space.
$P_{11}$=initial pressure at start of isothermal expansion.
$P_{12}$=final pressure at end of isothermal expansion.
$P_{21}$=initial pressure at start of isentropic expansion.
$P_{22}$=final pressure at end of isentropic expansion.
$P_a$=pressure defined as $10^5$ newtons/m.$^2$. (1 atmosphere=$1.01\times10^5$ newtons/m.$^2$).
$P_\epsilon$=electric power density—watts/m.$^2$.
$P_k$=kinetic power density—watts/m.$^2$.
$P_{0m}$=power concentration, the power converted per unit volume—watts/m.$^3$.
$\pi=\pi_1\pi_2$=overall pressure ratio.
$\pi_1$=pressure ratio during isothermal expansion=$P_{11}/P_{21}$.
$\pi_2$=pressure ratio during isentropic expansion=$P_{12}/P_{22}$.
$Q$=heat transferred to the charged aerosol-gas.
$Q_1$=heat in during isothermal expansion.
$Q_2$=heat rejected during isothermal compression.
$q$=charge per unit mass of charged aerosol-gas coulombs/kg.
$R$=gas constant, cals./mole.
$\overline{R}$=the ratio of mass of the liquid component to the mass of the charged aerosol-gas.

$\rho$=charge density of the charged aerosol coulombs/m.$^3$.
$S$=entropy.
$T$=temperature—° K.
$T_a=T/300$ in absolute relative temperature units compared to standard conditions taken as 300° K.=1 unit of temperature.
$T_1$=input temperature during isothermal expansion of the heat supplied by the "heat source."
$T_2$=output temperature during isothermal compression and rejection of heat to the "heat sink."
$\Delta T=T_1-T_2$.
$\tau$=temperature ratio per stage=$T_2/T_1$.
$U$=velocity in meters per second.
$U_1$=initial velocity when entering conversion space.
$U_2$=final velocity when leaving conversion space.
$V$=potential at a distance $x$ from collector—volts.
$\overline{V}$=variational volume ratio; the ratio of the volume of the gas component to the volume of the liquid component for a charged aerosol-gas.
$V_G$=volume of the gas component of a charged aerosol of mass $m$ and $m^3$.
$V_L$=volume of the liquid component of a charged aerosol of mass $m$ and mass ratio $\overline{R}$, $m^3$.
$v$=volume.
$V_c$=electric potential developed per stage at collector—volts.
$W_1$=work extracted during isentropic expansion.
$W_2$=work input during isentropic compression.
$W_E$=electrical work output—joules.
$W_k$=kinetic energy per unit mass of the aerosol joules/kg.
$w$=mode ratio, heat input/isentropic work output.
$w_{min}$=minimum mode ratio.
$w_{max}$=maximum mode ratio.
$x$=distance along flow axis in the conversion space m.
$Z$=the fraction of total aerosol mass that is liquid.

II. THERMODYNAMIC ANALYSIS

A. *The conversion of thermal to electrical energy from a charged aerosol via ideal Carnot cycles*

An analysis of the thermodynamic parameters of the system of the present invention is presented in this section.

The assumption of vanishing or negligible wasteful dissipation losses together with the *condition* that heat $\Delta Q$ is added reversibly at a temperature $T$ to the system allows the specification of the thermodynamic path taken by the gas.

In the Carnot cycle, two cases of operation are present:
(1) *Isentropic case.*—(Adiabatic)$\Delta S=0$.
(2) *Isothermal case.*—$\Delta S=\Delta Q/T$; $T$=a constant.

Assuming no wasteful dissipation losses, the Carnot cycle represents a *reversible* process. Since the working gas absorbs heat only at $T_1$ and rejects heat only at $T_2$, the efficiency of heat conversion to electrical energy under these ideal conditions of reversibility is:

$$\eta_c=(T_1-T_2)/T_1=\Delta T/T_1=1-\tau \qquad (0)$$

B. *The conversion of thermal to electrical energy from a charged aerosol via real Carnot cycles*

In the calculations realistic points of operation must be chosen governed by the following considerations:

(1) Input temperatures and pressures are limited by the maximum temperatures and pressures that engineering materials of today can withstand.

(2) A *lower* limit on pressure at any given temperature is that the gas density must be high enough to support a high concentration of power generation by suppressing possible electrical discharge in the generator.

(3) It is assumed that wasteful dissipation losses are proportional to the absolute value of mechanical-electrical work done, and that this fractional loss is $\epsilon$.

During the isentropic parts of the Carnot cycle, when the gas temperature is dropping from $T_1$ to $T_2$ during expansion, or when it is rising from $T_2$ to $T_1$ during compression, no heat is being added. Yet the internal energy of the gas is being converted to mechanical or electrical energy during expansion; or mechanical or electrical energy is being converted to internal energy during compression to close the loop. The conversion of internal energy into mechanical or electrical energy for those parts of the cycle for which $T_1$ drops to $T_2$ (when $\Delta Q=0$) is for constant inlet/outlet velocities.

$$W_1=c_p(T_1-T_2)=c_p T \qquad (1)$$

For $T_2$ being raised to $T_1$:

$$W_2=-c_p(T_1-T_2)=-c_p\Delta T \qquad (2)$$

Table I shows heat-work relationships, including the fractional loss $\epsilon$, over the various portions of the Carnot cycle. Considering $\epsilon$ as small, second order terms are neglected.

TABLE I

| Path | Modes of Operation | Heat | | Work | |
|------|-------------------|------|---|------|---|
| ab | Isothermal | $Q_1$ | In | Out | $(1-\epsilon)Q_1$ |
| bc | Isentropic | $\Delta Q=0$ | | Out | $(1-\epsilon)c_p\Delta T$ |
| cd | Isothermal | $Q_2=Q_1 T_2/T_1$ | Out | In | $(1+\epsilon)Q_2=(1+\epsilon)Q_1 T_2/T_1$ |
| da | Isentropic | $\Delta Q=0$ | | In | $(1+\epsilon)c_p\Delta T$ |

$\eta_c'$=[(Work out)—(Work in)]/Total work in as heat substituting from Table I.

$$\eta_c'=[\,(1-\epsilon)Q_1+(1-\epsilon)c_p\Delta T-(1+\epsilon)Q_1 T_2/T_1 \\ -(1+\epsilon)c_p\Delta T]/Q_1 \qquad (3)$$

Let a "Mode Ratio," $w$, be defined as the ratio of $Q_1$, the *Heat Energy Input*, isothermally at $T_1$, to the *Work Energy Out*, $c_p\Delta T$, isentropically; that is:

$$Q_1=w(c_p\Delta T) \qquad (4)$$

The ratio $w$ is utilized to determine the relative values of $Q_1$ and $\Delta T$ required for the efficient operation of a "real" cycle.

Simplifying expression (3), and substituting (4) the real Carnot Efficiency is:

$$\eta_c'=[1-(T_2/T_1)]-\epsilon[1+(T_2/T_1)+(2/w)] \qquad (5)$$

Let $\tau=T_2/T_1$ \qquad (6)

Substituting (6) in (5):

$$\eta_c'=(1-\tau)-\epsilon(1+\tau+2/w) \qquad (7)$$

Equation 7 is fundamental to the determination of an optimum design utilizing a practical Carnot cycle.

C. *Effect of Mode Ratio on Cycle Efficiency*

The minimum value of $w$ can be determined by putting $\eta_c'=0$ in (7), and solving for $w_{min}$. For small values of $\epsilon$, the following yields values for $w\!\gg\!w_{min}$ required for the cycle to produce a net power output.

$$w\!\gg\!w_{min}=2\epsilon/(1-\tau) \qquad (8)$$

Table II shows the effect of Mode Ratio $w$ on Real Carnot Efficiency $\eta_c'$, for the assumed values of $\epsilon$ and $\tau$:

TABLE II

| For $\epsilon=0.05$ | $\tau=0.5$ |
|---|---|
| Mode Ratio | Real Efficiency |
| $w$ | $\eta_c^1$ |
| 0.2 | 0.000 |
| 0.4 | 0.175 |
| 0.5 | 0.275 |
| 1.0 | 0.325 |
| 2.0 | 0.375 |
| 4.0 | 0.400 |
| $\alpha$ | 0.425 |
| For $\epsilon=0.00$ | $\eta_c^1=0.500$ Ideal Efficiency |

The effect of $w$ of the cycle efficiency is now apparent:
(1) Values of $0.2<w<1$ results in cycle efficiencies between 0% and 32.5%.
(2) Values of $w$ of from 1 to 2 result in cycle efficiencies between 32.5% and 37.5%.
(3) Values of $w>2$ do not markedly improve the cycle efficiency. For example for $2<w<4$ the cycle efficiency increases only from 37.5% to 40%.
(4) Hence, practical values for $w$ are:

$$1<w<2$$

(5) An upper practical limit to $w$ is also set by an increase in the overall pressure ratio. In FIGURE 5, utilizing Equation 45 which is subsequently presented, the curves of *Overall Pressure Ratio* $\pi$ versus *Temperature Ratio* $\tau$ are plotted for values of $w=0.25, 0.33, 0.50, 1.0, 1.33, 2.0$ and $4.0$.

D. *General thermodynamic properties of a charged aerosol*

For a duct of cross section area A; for steady flow condition:

$$\dot{M}=A\delta U \qquad (9)$$

where, for a perfect gas, using the perfect gas law:

$$\delta=P/RT \qquad (10)$$

Combining (9) and (10):

$$U=(\dot{M}/A)(RT/P) \qquad (11)$$

The kinetic energy per unit mass of the aerosol is:

$$KE=\tfrac{1}{2}U^2 \qquad (12)$$

The Enthalpy/unit mass of the charged aerosol, considered as a perfect gas in which the ratio of the liquid mass to the gas mass, $\bar{R}$, is negligible, is:

$$\Delta h=(c_v+R)\Delta T=c_p\Delta T \qquad (13)$$

Thus (13) is very nearly true for the condition that the ratio of the mass of the liquid to the mass of the gas of a charged aerosol is very small; that is:

$$\bar{R}\lessapprox 0.01 \qquad (14)$$

1. *Effect of Mass Ratio on Isentropic Operation*

Equation 13 assumes that the ratio of the mass of the liquid to the mass of the gas of the charged aerosol, $\bar{R}$, is small, less than 1%, so that practically all heat resides in the internal energy of the gas. Conditions 13 and 14 will be utilized for isentropic expansion and compression.

2. EFFECT OF MASS RATIO ON ISOTHERMAL OPERATION

For the addition or extraction of heat in isothermal operation, the ratio $\bar{R}$ is increased so that most of the heat energy of the charged aerosol resides in the liquid component.

Z is the fraction of total charged aerosol mass that is liquid, thus:

$$Z=\bar{R}/(\bar{R}+1) \qquad (15)$$

Hence, the change in enthalpy is:

$$\Delta h=[Zc_L+(1-Z)c_p]\Delta T \qquad (16)$$

In (15), for:

$$\bar{R}\gg 1, \text{ then } Z\to 1 \qquad (17)$$

When condition (17) is satisfied, substantially all of the internal heat energy of the aerosol resides in the liquid component.

In a charged aerosol there is an intimate mixture of liquid and gas phases, and a large interfacial area between the liquid and gas phases of the charged aerosol. Consequently, heat is readily interchanged between the liquid and gaseous phases of the charged aerosol. Hence, when condition (17) obtains, the expansion or compression mode of the aerosol is predetermined as substantially isothermal.

3. THE CASE OF IDEAL ISOTHERMAL OPERATION

As above described, when $\bar{R}$, the ratio of "the mass of the liquid" to "the mass of the gas" of a charged aerosol, is adjusted to a large value, most of the heat energy resides in the liquid component of the charged aerosol. This tends to stabilize the temperature of the aerosol during expansion or compression, by internal heat transfer from the liquid to the gas component, or vice versa, so that:

$$\Delta T\cong 0$$

(a) *Energy.*—Hence, T is substantially a constant in:

$$Pv=RT \qquad (18)$$

Then the work output during isothermal expansion is:

$$\Delta Q=\Delta W=-RT\int_{P_{21}}^{P_{11}}dP/P \qquad (19)$$

$$\Delta Q=\Delta W=RT\ln(P_{11}/P_{21}) \qquad (20)$$

(b) *Pressure ratios versus temperature ratios.*—From (20):

$$P_{11}/P_{21}=\pi_1=e^{\Delta Q/RT} \qquad (21)$$

But, from (4):

$$\Delta Q=Q_1=wc_p\Delta T \qquad (22)$$

Hence, combining (21) and (22):

$$\pi_1=e^{w(c_p/R)\Delta T/T_1} \qquad (23)$$

Using (0) in (23):

$$\pi_1=e^{(c_p/R)w(1-\tau)} \qquad (24)$$

(c) *Inlet/outlet area ratios.*—The ratio of outlet area ratio is, from (9):

$$(A_{21}/A_{11})=\delta_{11}U_{11}/\delta_{21}U_{21} \qquad (25)$$

Substituting from (10) into (25), and noting that T is substantially constant:

The electrical power output, under isothermal conditions, can be due to a direct conversion of the thermal power input; or the kinetic power, or both, hence:

$$(U_{11}/U_{21})\lessgtr 1 \text{ and } P_{11}>P_{21} \qquad (26)$$

Outlet area is greater than inlet area for a generator, thus:

$$(A_{21}/A_{11})=(U_{11}/U_{21})(P_{11}/P_{21}) \qquad (27)$$

(d) *Mach number.*—The ratio of outlet Mach number to inlet Mach number ratio for a duct having inlet and outlet areas $A_{11}$ and $A_{21}$ respectively is determined as follows:

$$\bar{M}=U/C \qquad (28)$$

It is well known that:

$$C=\sqrt{\gamma RT} \qquad (29)$$

From (28):

$$\overline{M}_{21}/\overline{M}_{11} = (U_{21}/U_{11}) \cdot (C_{11}/C_{21}) \quad (30)$$

But since, $$T_1 = T_2, \ C_{11} = C_{21} \quad (31)$$

From (27):

$$(A_{21}/A_{11}) = (M_{11}/M_{21})(P_{11}/P_{21}) = (M_{11}/M_{21})\pi_1 \quad (32)$$

During isothermal power conversion at constant velocity and constant Mach number, the pressure drops, and the duct diameter increases, so that:

$$(A_{21}/A_{11}) = (P_{11}/P_{21}) = \pi_1 \quad (33)$$

4. THE CASE OF IDEAL ISENTROPIC OPERATION $$\Delta S = 0$$

For a charged aerosol working substance, operating isentropically, Z is adjusted to a small value so that substantially all of the heat energy of the gas resides in the gas component:

(a) *Energy.*—

$$\Delta W = c_p \Delta T \quad (34)$$

(b) *Pressure ratio versus temperature ratio.*—By definition:

$$\gamma = c_p/c_v \quad (35)$$

The following relations apply for this case:

$$P_{12}v^\gamma_{12} = P_{22}v^\gamma_{22} \quad (36)$$

$$P_{12}^{1-\gamma}T_1^\gamma = P_{22}^{1-\gamma}T_2^\gamma \quad (37)$$

Hence from (37):

$$\pi_2 = \tau^{-\gamma/(\gamma-1)} \quad (38)$$

(c) *Inlet/outlet area ratios.*—From (9):

$$(A_{22}/A_{12}) = (U_{12}/U_{22})(T_2/T_1)(P_{12}/P_{22}) \quad (39)$$

From (10):

$$(A_{21}/A_{12}) = (U_{12}/U_{22})\tau\pi_2 \quad (40)$$

From (38):

$$(A_{21}/A_{12}) = (U_{12}/U_{22})\tau^{1-[\gamma/(\gamma-1)]} \quad (41)$$

which simplifies to:

$$(A_{22}/A_{12}) = (U_{12}/U_{22})\tau^{-1/(\gamma-1)} \quad (42)$$

Using the Mach number relationship (29) and (30), the velocity ratio is computed as follows:

$$(U_{12}/U_{22}) = (\overline{M}_{12}/\overline{M}_{22})(C_1/C_2) = (\overline{M}_{12}/\overline{M}_{22})\tau^{-\frac{1}{2}} \quad (43)$$

Substituting (43) and (41) into (43):

$$(A_{22}/A_{12}) = (M_{12}/M_{22})\tau^{-(\gamma+1)/2(\gamma-1)} \quad (44)$$

(d) *Inlet/outlet area ratio at constant Mach No.*—In (44) $\tau$ is fractional. For a generator having a constant Mach number, and using nitrogen $\gamma \cong 1.36$, then $$(\gamma+1)/2(\gamma-1) = 3.28$$

the cross sectional area increases according to $\tau^{-3.28}$ during isentropic operation; or for $\tau = 0.5$, $0.5^{-3.28} = 9.72$, inlet/outlet area ratio of approximately 10 times.

5. OVERALL PRESSURE RATIOS

Equation 23 gives the pressure ratio $\pi_1$ for the isothermal parts of a Carnot cycle having the temperature ratio $\tau$. Equation 38 gives the pressure ratio $\pi_2$ for the isentropic parts of a Carnot cycle having the temperature ratio $\tau$.

The final pressure under isothermal operation is the same as the initial pressure under the isentropic operation; accordingly:

*The overall pressure ratio* $\pi$, for the complete Carnot cycle is given by:

$$\pi = \pi_2\pi_1 = \tau^{-\gamma/(\gamma-1)} \cdot e^{(c_p/R)w(1-\tau)} \quad (45)$$

Equation 45 therefore summarizes the thermal parameters relationships involving the pressure and temperature ratios.

Equation 45 shows that the overall pressure ratio, $\pi$, of a Carnot cycle depends only on the temperature ratio $\tau$ and the mode ratio $w$.

Figure 6:
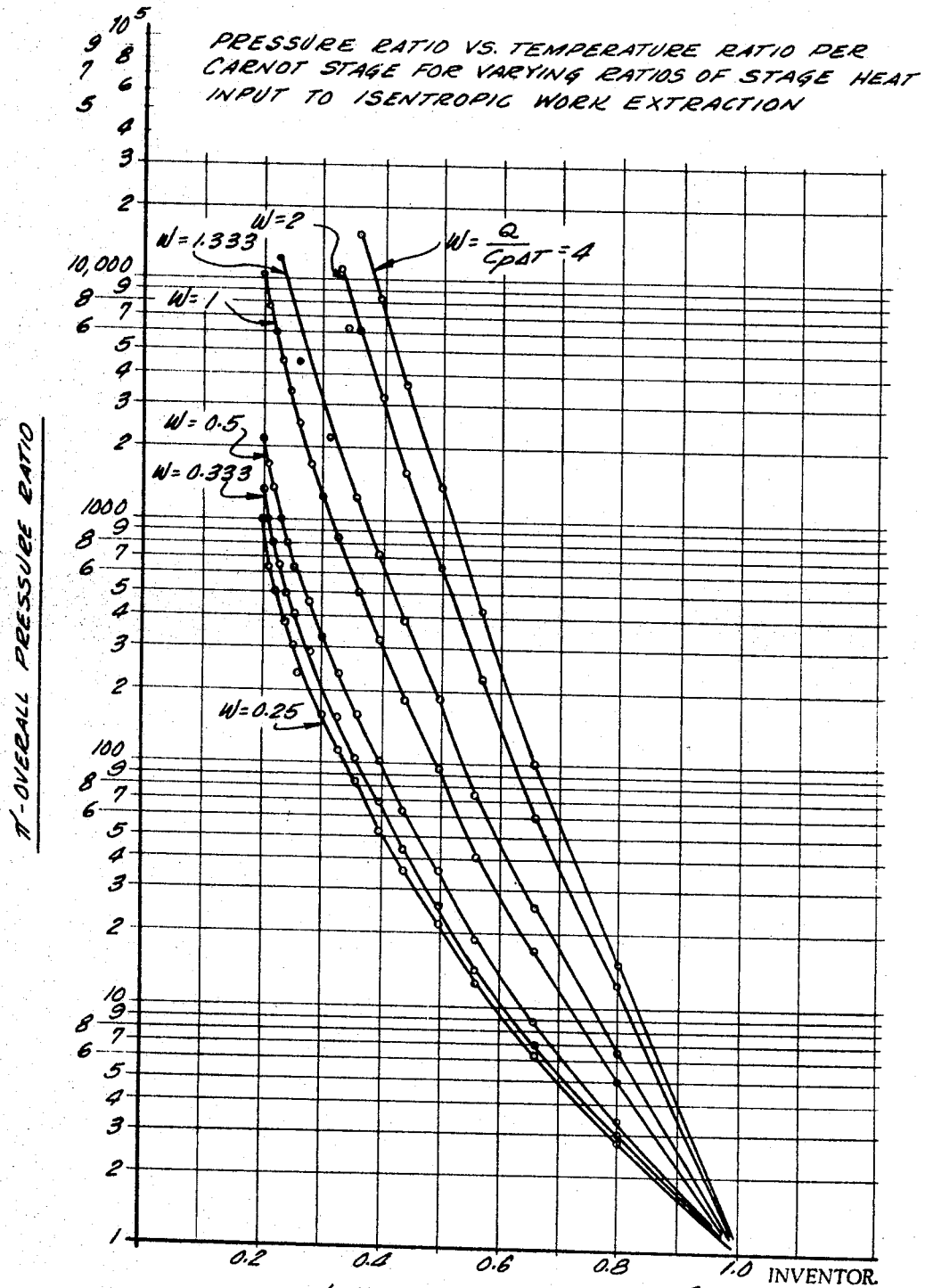
FIGURE 6 shows the pressure ratio versus temperature ratio per Carnot stage for varying ratios of stage heat input to isentropic work extraction.

FIGURE 6 shows a plot of $\pi$ versus $\tau$ for various values of $w$.

Comparing Equation 7 for real efficiency, with Equation 45 for the pressure ratio-temperature ratio, it is apparent that:

The choice of definite values for—
(a) Temperature Ratio, $\tau$
(b) Mode Ratio, $w$, or the Work Ratio for isothermal and isentropic stages, and
(c) Loss factor $\epsilon$ simultaneously fixes the value of:
  (i) *Real Efficiency*, $\eta_c'$, or, *Net Power Out/Heat Power In*, and
  (ii) *Overall Pressure Ratio*, $\pi$.

6. MULTILOOP OPERATION AT CONSTANT REAL EFFICIENCY PER LOOP

Figure 7:
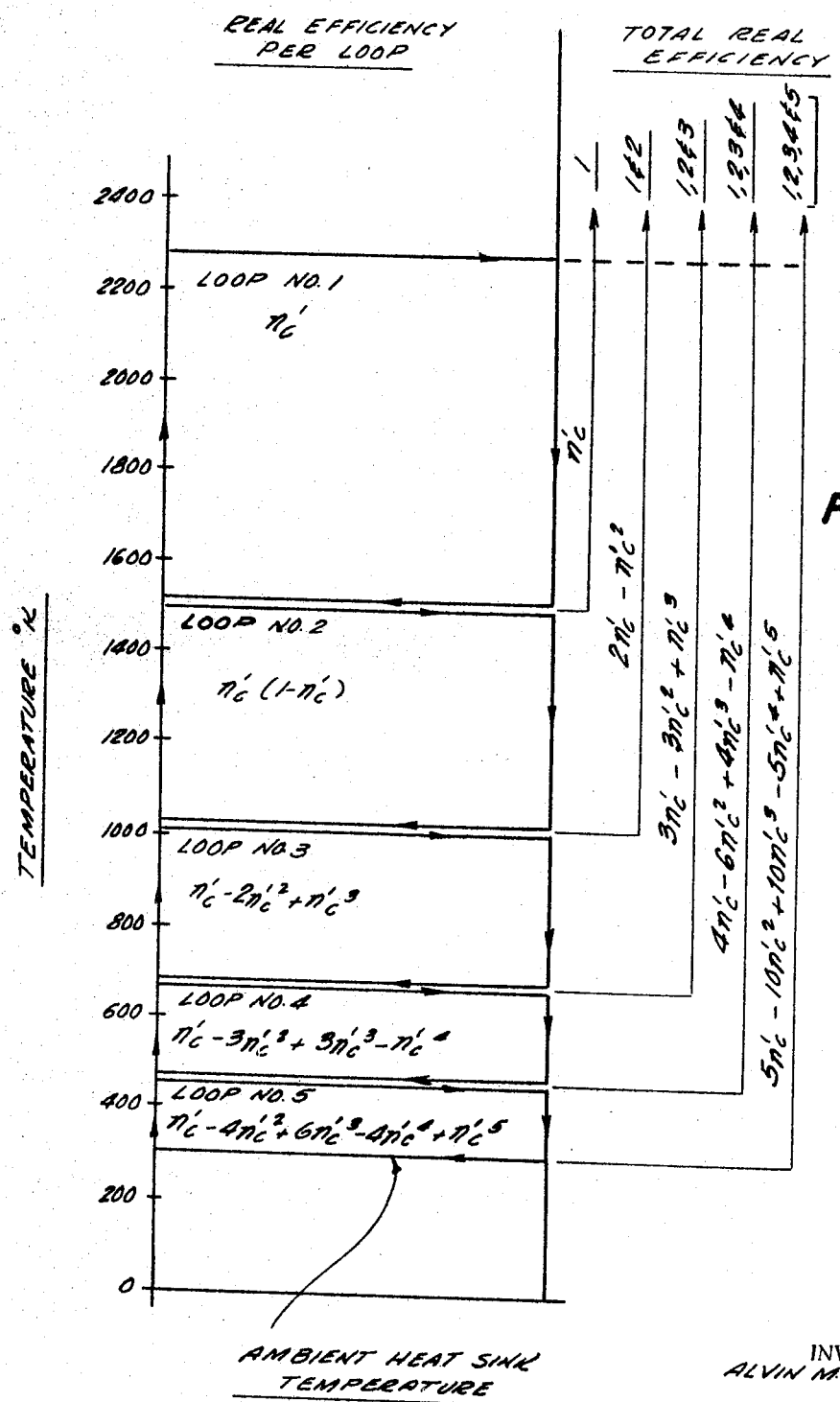
FIGURE 7 is a generalized multiloop cycle for constant real Garnot efficiency cycle loops wherein loops have the same temperature ratio $\tau$.

FIGURE 7 shows a T–S diagram of a generalized multiloop Carnot cycle system in which the *real efficiency* per loop is *constant*. This is accomplished by using a constant temperature ratio $\tau$, a constant mode ratio, $w$, and a constant loss factor per unit of work $\epsilon$. The result is a constant efficiency $\eta_c'$ per loop.

7. TOTAL REAL EFFICIENCY OF MULTILOOP CYCLES

Referring to FIGURE 6, there is shown a T–S diagram of generalized multiloop cycles, for a *fixed temperature ratio per cycle*. The temperature ratio, mode ratio and loss factor are specified as constant per loop; therefore the efficiency per loop and the behavior of such multiloop cycles can be readily computed. Within each loop is shown the net power out for the loop, considering the input heat as unity power. Also shown is the *total power out*, as the *total efficiency* for 1, 2, 3, 4 and 5 loops. This is summarized in Table III, which follows:

TABLE III.—TOTAL REAL EFFICIENCY OF MULTILOOP CYCLES

| No. of Loops | Proportion of Power Out Per Loop, Equation No. (45) | Total Power Out and Total Real Efficiency, Equation No. (46) |
|---|---|---|
| 1 | $\eta_c'$ | $\eta_c'$ |
| 2 | $\eta_c' - \eta_c'^2$ | $2\eta_c' - \eta_c'^2$ |
| 3 | $\eta_c' - 2\eta_c'^2 + \eta_c'^3$ | $3\eta_c' - 3\eta_c'^2 + \eta_c'^3$ |
| 4 | $\eta_c' - 3\eta_c'^2 + 3\eta_c'^3 - \eta_c'^4$ | $4\eta_c' - 6\eta_c'^2 + 4\eta_c'^3 - \eta_c'^4$ |
| 5 | $\eta_c' - 4\eta_c'^2 + 6\eta_c'^3 - 4\eta_c'^4 + \eta_c'^5$ | $5\eta_c' - 10\eta_c'^2 + 10\eta_c'^3 - 5\eta_c'^4 + \eta_c'^5$ |

8. TEMPERATURE RATIO $\tau$, VERSUS MODE RATIO $w$, FOR CONSTANT REAL EFFICIENCY $\eta_c'$, PER LOOP Solving Equation 7 for $\tau$:

$$\tau = [(1-\eta_c') - \epsilon(1+2/w)]/(1+\epsilon) \quad (46)$$

Values of $\tau$ versus $w$ for various values of $\eta_c'$, setting $\epsilon = 0.05$ are shown in Table IV, which follows, and were computed from Equation 45.

TABLE IV.—TOTAL REAL EFFICIENCY PER LOOP

| Mode Ratio, $w$ | 20% | 30% | 40% | 50% | 60% |
|---|---|---|---|---|---|
| | Temperature Ratio | | | | |
| | $\tau$ | $\tau$ | $\tau$ | $\tau$ | $\tau$ |
| 0.25 | 0.382 | 0.286 | 0.191 | 0.048 | 0.001 |
| 0.33 | 0.477 | 0.381 | 0.286 | 0.143 | 0.096 |
| 0.50 | 0.572 | 0.476 | 0.381 | 0.238 | 0.191 |
| 1.00 | 0.677 | 0.571 | 0.476 | 0.333 | 0.286 |
| 1.33 | 0.691 | 0.595 | 0.500 | 0.357 | 0.310 |
| 2.00 | 0.714 | 0.618 | 0.523 | 0.380 | 0.333 |
| 4.00 | 0.738 | 0.642 | 0.547 | 0.404 | 0.357 |

Figure 8:
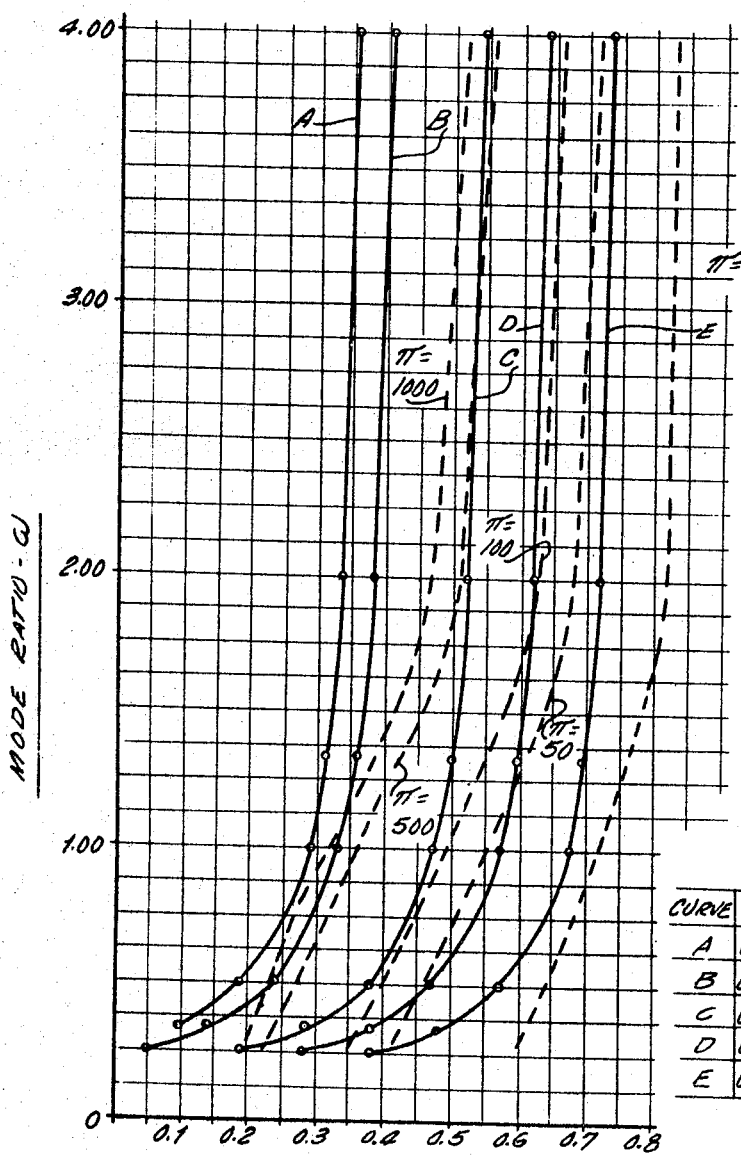
FIGURE 8 is a graphic representation of the change in mode ratio, $w$ versus temperature ratio of constant overall pressure ratio $\pi$ and constant real Carnot efficiency, $\eta_c$, using a fractional loss ratio per cycle of $\epsilon=0.05$.

On FIGURE 8 *lines of constant real efficiency* for 1 loop for $100\eta_c' = 30$, 40, 50, 60 and 70%, are plotted as the parameter for Temperature Ratio and Mode Ratio using Equation 46 and Table IV.

Inserting these values of $\eta_c'$ into Equation 45, (3rd column of Table III), the corresponding values of *Total Real Efficiency* for 1, 2, 3, and 4 loops are computed; these values are shown in the following Table V:

TABLE V.—TOTAL REAL EFFICIENCY OF MULTILOOP CYCLES

| Curve | $\eta_c'$ | | | | | |
| --- | --- | --- | --- | --- | --- | --- |
|  | No. Loops | | | | | |
|  | 1 | 2 | 3 | 4 | 5 | $\tau$/loop |
| A | 0.60 | 0.84 | 0.94 | 0.97 | 0.99 | 0.4 |
| B | 0.50 | 0.75 | 0.88 | 0.94 | 0.97 | 0.5 |
| C | 0.40 | 0.64 | 0.78 | 0.87 | 0.88 | 0.6 |
| D | 0.30 | 0.51 | 0.66 | 0.76 | 0.83 | 0.7 |
| E | 0.20 | 0.36 | 0.49 | 0.59 | 0.67 | 0.8 |

FIGURE 8 shows for $w$ versus $\tau$, *lines of total real efficiencies* for 1, 2, 3 and 4 loop cycles, and also lines of constant overall pressure ratio, plotted from Equation 45.

Using FIGURE 8, and selecting a *given total real efficiency, for a given number of loops*, there is simultaneously determined:
(a) Overall Pressure Ratio, $\pi$
(b) Temperature Ratio per Loop, $\tau$
(c) Mode Ratio, $w$
(d) Total Real Efficiency for all Loops Combined.

9. MAXIMUM REAL EFFICIENCY OF A SINGLE LOOP CYCLE

Assuming a maximum practical overall pressure ratio $\pi$ of 200 atmospheres, a mode ratio $w=1$, and a loss factor of 5%, FIGURE 8 shows that a single loop Carnot cycle will operate at a real efficiency of 50%.

A single loop Carnot cycle of 60% real efficiency is attained at very high overall pressure ratios, $\pi$, of the order of 2,000.

10. NUMBER OF LOOPS FOR A 60% TOTAL REAL EFFICIENCY

To obtain a real efficiency of 60% or more at an overall pressure ratio $\pi$ of 200 atmospheres or less per loop, FIGURE 8 shows that two or more loops must be utilized.

11. TWO LOOP CYCLES WITH EFFICIENCY EXCEEDING 60%

Two loop cycles have the following characteristics: A two loop water-air cycle or gallium-nitrogen cycle, for example, operates at 64% efficiency with the following characteristics:

$$\pi=200$$
$$\tau=0.5$$
$$w=1.35$$
$$\epsilon=0.05$$

Heat source at 1200° K. maximum temperature
Heat sink at 300° K. minimum temperature

12. THREE LOOP CYCLES WITH EFFICIENCY EXCEEDING 60%

A three loop cycle operating with a gallium-nitrogen aerosol for each loop has the following characteristics:

Overall real efficiency=78%
$$\pi=200$$
$$\tau=0.5$$
$$\epsilon=0.05$$
$$w=1.35$$

Heat source at 2400° K. maximum temperature
Heat sink at 300° K. minimum temperature

13. EFFECTS OF CHANGE OF MODE RATIO

Analysis of FIGURE 8 shows that with a change in Mode Ratio from $w=0.75$ to $1.25$, *the lines of constant efficiency* and the lines of constant overall pressure ratio run almost parallel. By increasing the Mode Ratio $w$, the Temperature Ratio $\tau$ is decreased. As a result, the maximum cycle temperature is reduced while the overall pressure ratio and the total real efficiency remain practically constant.

14. VARIATIONAL SPECIFIC HEAT RATIOS

Heat content is defined as:

$$H = m\int_{T_1}^{T_2} c_p \, dT \qquad (47)$$

The constant of integration may be avoided by evaluating $dH$.

$$dH = d\left[ m\int_{T_1}^{T_2} c_p \, dT \right] = m c_p \, dT \qquad (48)$$

Where $T_1$ and $T_2$ are, respectively, the minimum and maximum temperatures between which there will be no change in phase of either gas or liquid.

Variational specific heat ratio $\overline{H}$ is defined for a differential change in temperature $\Delta T$ of a unit volume of charged aerosol, as the ratio of "change of heat content of the gas component $(dH_G)$" to the "change of heat content of the liquid component $(dH_L)$", in which the liquid and gas components exist in a ratio, $\overline{R}$.

$$\overline{H} = dH_G / dH_L \qquad (49)$$

Since (49) must be evaluated at the same temperature and same differential temperature $\Delta T$, for the gas component and the liquid component of the charged aerosol:

$$\overline{H} = m_G c_p \, dT / m_L c_L \, dT = (m_G/m_L)(c_p/c_L) \qquad (50)$$

$$\overline{H} = (1/\overline{R})(c_p/c_L) \qquad (51)$$

The volume ratio $\overline{V}$ versus $\overline{R}$ for various materials is found as follows:

$$\overline{V} = V_G/V_L = (m_G/\delta_G)/(m_L/\delta_L) = (m_G/m_L)(\delta_L/\delta_G)$$
$$= (1/\overline{R})(\delta_L/\delta_G) \qquad (52)$$

There follows a table of specific heats and density at standard temperature and pressure for various gases and liquids in cal./gr.-°K. (or B.t.u./lb.-°R.). Density is expressed in kg./m.³ under the defined standard conditions:

$$300°K.(T_a=1) \text{ and } 10^5 \text{ newtons/m.}(\delta_a=1)$$

TABLE VI

| Material | Phase | Specific heat | Symbol | Density | Symbol |
| --- | --- | --- | --- | --- | --- |
| Water | Liquid | 1.00 |  | 1×10³ |  |
| Gallium | Liquid | 0.893 | $c_p$ | 6.09×10³ | $\delta_L$ |
| Mercury | Liquid | 0.333 |  | 13.6×10³ |  |
| Nitrogen | Gas | 0.248 |  | 1.125 |  |
| Air | Gas | 0.24 | $c_L$ | 1.163 | $\delta_G$ |

As an example, evaluating $\overline{H}$ for a charged aerosol comprising air and water:

$$\overline{H}=(1/\overline{R})(0.24/1) \quad (53)$$
$$\overline{H}=0.24/\overline{R} \quad (54)$$

From the known data in Table III, the variational specific heat $\overline{H}$ was computed for charged aerosols respectively comprising nitrogen as the gas component and water, mercury or gallium as the liquid component for various mass ratios $\overline{R}$.

FIGURE 9 shows for charged aerosols of different compositions a log-log plot of the "variational specfic heat $\overline{H}$" versus "the ratio of the mass of the liquid to the mass of the gas, $\overline{R}$," under standard conditions.

FIGURE 10 shows for charged aerosols of different compositions, a log-log plot of $\overline{V}$, the ratio of the "mass of the liquid" to the "mass of the gas" under standard conditions.

III. ELECTRODYNAMICS OF THE CHARGED AEROSOL

In U.S. Patent No. 2,638,555 to Alvin M. Marks there is a mathematical-physics analysis of the frictionless constant thermodynamic state which disclosed that:
(1) The electrical output is limited by spark breakdown of the gas.
(2) The charged aerosol creates a space charge, with the electrical potential increasing parabolically with distance, and reaching a maximum at a critical conversion space length.
(3) The conversion space length is inversely proportional to charge density.
(4) Lower voltages and higher current densities are obtained with shorter conversion lengths, which are of the order of millimeters.

All of these analytical results have recently been verified experimentally. Theoretical and experimental results show close agreement.

The following analysis is based on that shown in the Patent No. 2,638,555 but has been further modified to exhibit the effects of gas electrical breakdown value, $b_g$, and a new effect, the electrical breakdown due to the aerosol $k$. Also new is the introduction of the relative molecular weight of the gas, inasmuch as this affects the density of the gas, and hence the kinetic power.

The peak voltage was given by the following formula:

$$V_c = \rho L^2/2\epsilon_0 \text{ (volts)} \quad (55)$$

The maximum field intensity, given by the space charge formula occurs at the plane of the conversion space entrance and is limited by the electric breakdown strength of the charged aerosol gas:

$$E_m = 2V_c/L = \rho L/\epsilon_0 = b_4 b_g k \delta_a \text{ (volts/m.)} \quad (56)$$

The maximum voltage which may be generated at each stage is limited by spark breakdown, thus:

$$V_c = (b_0/2) L b_g k \delta_a \quad (57)$$

The current density is given by:

$$j = \rho U \text{ (amps./m.}^2) \quad (58)$$

The motion of the charged aerosol could be created by the expansion of a gas from a liquid heated in a boiler (Rankine cycle).

The input kinetic power density of the gas is given by:

$$p_k = \delta U^3/2 = (\delta_0/2) m_r \delta_a U^3 \text{ (watts/m.}^2) \quad (59)$$

The output electrical power density of the gas from (55), (56), (57) and (58) is given by:

$$p\epsilon = jV_c = (b_0^2 \epsilon_0/2) b_g^2 k^2 \delta_a^2 U \quad (60)$$

where $(b_0^2 \epsilon_0/2) = 42$.

From (59) and (60) the conversion efficiency of kinetic power to electric power for one stage is given by:

$$\eta_A = p\epsilon/p_k = (b_0^2 \epsilon_0/\delta_0) b_g^2 k^2 \delta_a / U^2 m_r \quad (61)$$

where $(b_0^2 \epsilon_0/\delta_0) = 72$.

Examples applying these formulae are given hereinafter.

Experimentally, the voltage was found to rise linearly with the gas density, or pressure at constant temperature. The current was also found to rise linearly with gas density, or pressure at constant temperature. As a consequence, the power is found to rise as the square of the gas density, or the square of pressure at constant temperature. We also found that the critical length of the conversion space was related to charge density and the maximum electric voltage as originally predicted by Equations 55 and 57.

Using a range of values $1 < b_g < 3$, $\delta_a = 20$ and a velocity of about 350 m./sec., according to (60), the corresponding power density output per stage varies from 5 to 50 megawatts/m.² per stage.

Assuming 20 mm. per stage, if 50 stages are packed into 1 m.³, the power concentration will vary between 250 to 2500 megawatts/m.³; which is an enormous conversion of power in such a small volume.

Assuming a mean density of $5 \times 10^3$ kg./m.³, the power/mass ratio, for the charged aerosol power converter only, is about 25 to 250 kw./kg., which is impressively large by comparison with other devices known today.

Using $L = 3 \times 10^{-3}$ (3 mm. for conversion space), from (57) the maximum voltage generated per stage is:

$$V_c \cong 90 \text{ to } 280 \text{ kilovolts}$$

The corresponding current density is:

$$j = p_\epsilon/V_c \cong 50 \text{ to } 200 \text{ amps./m.}^2$$

A study was made of friction power losses and how to minimize them. Assuming no shock wave compression, friction power loss per unit or cross section flow area is given by the following formula:

$$p_f = [C_f \delta_0/2](L/D) m_r \delta_a U^3 \quad (62)$$

From (61) and (62) an estimate of $\eta_f$, the ratio of the friction power loss, to the electric power output, per stage, is obtained:

$$\eta_f = (p_f/p_\epsilon) = (\delta_0 C_f/\epsilon_0 b_0^2)(L/D) U^2 / a_f^2 k^2 \delta_a \quad (63)$$

where, using $C_f = 0.020$, $(\delta_0 C_f/\epsilon_0 b_0^2) = 2.8 \times 10^{-4}$, and $a_f$ is a figure of merit which is a characteristic of a gas and is defined as:

$$a_f = b_g / \sqrt{m_r} \quad (64)$$

For air, $a_f = 1$.

To make $\eta_f$ negligible with $k=1$, it is concluded that:
(1) The velocity of the gas must be as small as possible.
(2) The figure of merit of the gas, $a_f$, should be as large as possible.

To obtain a larger value of $a_f$, the relative average molecular weight of the gas, $m_r$, must be small and the relative electric breakdown strength, $b_g$, must be large. Mixtures of hydrogen, helium, steam and an inhibitor gas such as $SF_6$ may be used. This results in a charged aerosol gas having a relative molecular weight compared to air of approximately 0.1 and a relative electric breakdown strength compared to air under standard conditions of about 3, and $a_f$ may be as much as 10.

(3) The relative density $\delta_a$, should be large, say 10–60.
(4) The ratio $(D/L)$, that is the ratio of the "length of the conversion space" to the "diameter of conversion space," must be a minimum.

For example, with $U = 350$ m./sec., $k=1$, $\delta_a = 20$, taking $(L/D) = 0.1$ and with $1 < a_f < 10$, the fractional friction power loss $\eta f$ varies from 17 to 0.17% of the electrical power output.

Small diameter tubes, with $D \cong L$ result in excessive power loss; 170% or more of the electric power output, whereas with suitably chosen design parameters $\eta_f$ is negligible.

(5) If $k=10$, then the fractional friction power loss $\eta_f$ reduces to a negligible value even for $D=L$.

Reduction of percent friction power loss, and increased power conversion efficiencies, are thus compatible as the conditions are adjusted, to accomplish both results.

There is obtained, for example, a conversion efficiency of $\eta_A = 43\%$ per stage. The conditions for $k=1$, a gas mixture such as above suggested in which $b_g \cong 3$ and $m_r \cong 0.1$, relative density $\delta_a = 6.6$, and $U = 367$ m./sec. This corresponds to a Mach No. of 1/3, for $m_r = 0.1$ @ 300° K., for which the sonic velocity is approximately 1100 m./sec., increasing with $\sqrt{T}$.

Although very satisfactory designs can be achieved with $k=1$, an increase in the value of $k$ is crucial to simplify the design of charged aerosol generators, and improve their performance. If $k$ equals or exceeds 1.5, then the results are better proportionately to $k^2$.

I have observed $k=1.6$, although this is not an upper limit, and higher values may be obtained with a greater particle cross section, and stronger supercooling. With values of $k$ of the order of 3 or more, the design of compact devices in the 1–10 kw. range with smaller ($L/D$) ratio, negligible friction power loss, and with one or a few electrical stages, is facilitated.

Advantages of the charged aerosol electrothermodynamic devices are:

(1) High power density 0.1 to 50 megawatts/m.$^2$.
(2) High power concentration 1 to 1000 megawatts/m.$^3$.
(3) High power to mass ratio $10^3$ to $10^5$ watts/kg.
(4) A static device containing no moving parts except moving gases and liquids.
(5) High Carnot Efficiency may be operated from higher than 1500° K. to 2000° K.
(6) Low investment cost and maintenance costs per unit of lower output.
(7) High reliability.
(8) Silent operation.

Having thus fully described the invention what is claimed as new and desired to be secured by United States Letters Patent is:

1. A single loop power transducer for converting heat and kinetic power to electrical power in an electrothermodynamic cycle of the Carnot type comprising a heat source, a first heat exchanger to receive heat from the heat source, a quantity of liquid under pressure in the first heat exchanger, a source of gas connected to the first heat exchanger and passing therethrough, pump means to force the gas through the first heat exchanger, a first aerosol forming and charging device connected to the liquid and gas in the first heat exchanger comprising the isothermal expansion stage of the cycle, a first collector electrode spaced from the aerosol forming and charging device to receive and extract the aerosol charge, means to collect and remove the liquid in the aerosol as it traverses the first collector electrode, means to return the liquid from the first collector electrode to the first heat exchanger, a second aerosol forming and charging device connected to the liquid in the first heat exchanger and the gas traversing the first collector electrode comprising the adiabatic expansion stage of the cycle, a second collector electrode spaced from the second aerosol forming and charging device to receive and extract the aerosol charge, means to collect and remove the liquid in the aerosol as it traverses the second collector electrode, means to direct the liquid from the second collector electrode to an adiabatic compressor to receive the liquid from the second collector electrode, an isothermal compressor to receive the gas traversing the second collector electrode, a second heat exchanger connected to the isothermal compressor, a source of liquid under pressure in the second heat exchanger, means to direct the gas coming from the isothermal compressor into the adibatic compressor and means to direct the gas and liquid from the adiabatic compressor back to the first heat exchanger.

2. A power transducer according to claim 1 in which the adiabatic and isothermal compressors each comprise an aerosol forming and charging device, a collector electrode spaced from the aerosol forming and charging device and a source of potential connected to each of the collector electrodes.

3. A power transducer according to claim 1 in which the ratio of the liquid mass to the gas mass in the isothermal expansion stage is of the order of 10 and the ratio of the liquid mass to the gas mass in the adiabatic expansion stage is of the order of 0.01.

4. A multiple loop power transducer for converting heat and kinetic power to electrical power in an electrothermodynamic cycle of the Carnot type, the first of said loops comprising a heat source, a first heat exchanger to receive heat from the heat source, a quantity of liquid under pressure in the first heat exchanger, a source of gas connected to the first heat exchanger and passing therethrough, pump means to force the gas through the first heat exchanger, a first aerosol forming and charging device connected to the liquid and gas in the first exchanger, comprising the isothermal expansion stage of the cycle, a first collector electrode spaced from the aerosol forming and charging device to receive and extract the aerosol charge, means to collect and remove the liquid in the aerosol as it traverses the first collector electrode, means to return the liquid from the first collector electrode to the first heat exchanger, a second aerosol forming and charging device connected to the liquid in the first heat exchanger and the gas traversing the first collector electrode comprising the adiabatic expansion stage of the cycle, a second electrode spaced from the second aerosol forming and charging device to receive and extract the aerosol charge, means to collect and remove the liquid in the aerosol as it traverses the second collector electrode, means to direct the liquid from the second collector electrode to an adibatic compressor, an isothermal compressor to receive the gas traversing the second collector electrode, a second heat exchanger connected to the isothermal compressor to receive liquid traversing the isothermal compressor, a source of liquid under pressure in the second heat exchanger, a quantity of gas under pressure in the second heat exchanger, means to direct the gas coming from the isothermal compressor into the adibatic compressor, means to direct the gas and liquid from the adiabatic compressor back to the first heat exchanger and means to direct the liquid in the second heat exchanger through the isothermal compressor and a second loop of the power transducer of substantially the same construction as the first loop.

5. A method of converting heat energy into electrical energy comprising the following steps: simultaneously forming and charging a first aerosol comprising a gas and finely divided liquid droplets in which the ratio of the liquid mass to the gas mass is adjusted to a large value, providing said aerosol with an initial velocity and a predetermined temperature, decreasing the velocity and decreasing the heat content of the aerosol while passing the charged droplets through a repelling electric field to increase the droplet potential, electrically discharging the droplets by collecting the charges on an electrode, separating the liquid from the gas, simultaneously forming and charging a second aerosol comprising the gas coming from the first aerosol and finely divided liquid droplets in which the ratio of the liquid mass to the gas mass is small, providing said charged aerosol with an initial velocity and a predetermined temperature, decreasing the velocity and decreasing the heat content of the aerosol while passing the charged droplets through a repelling electric field to increase the droplet potential, electrically discharging the droplets by collecting the charges on an electrode separating the liquid from the gas, passing the liquid through a first compressor, passing the gas through a second compressor and thereafter returning the compressed liquid and gas to form the first charged aerosol in a continuous cycle.

6. A multiple loop power transducer according to claim 4 in which the residual heat from the last loop is transferred by means of a heat exchanger at the lowest temperature to a heat sink.

7. The method of controlling the modes of isothermal and adiabatic expansion and compression in a Carnot cycle engine employing a charged aerosol as the working substance which comprises varying the ratio of the liquid mass to greatly exceed the gas mass in the isothermal mode and to be substantially less than the gas mass in the adiabatic modes.

8. A method for converting the heat energy of a charged aerosol at a high temperature into electrical energy by means of a single loop Carnot cycle which comprises the steps of providing first, second, third and fourth aerosol energy conversion devices, the first and third of said devices being used to effect the isothermal expansion and compression stages of said cycle, respectively, and the second and fourth of said devices being used to effect the adiabatic expansion and compression stages of said cycle, respectively, the charged aerosols for said isothermal devices having liquid mass to gas mass ratios which are high so that most of the heat energy of the aerosols is in the liquid thereof and the charged aerosols for the adiabatic devices having liquid mass to gas mass ratios which are low so that most of the heat energy of the charged aerosols is in the gas thereof, passing the charged aerosol for the isothermal device from said source through said first device thereby to convert a part of the heat energy thereof into electrical energy, forming a charged aerosol for the adiabatic device which includes the gas from the first device, passing said charged aerosol through said second device thereby to convert an additional part of the heat energy of the charged aerosol into electrical energy, forming another charged aerosol for the compression isothermal device including the gas from said second device, passing said charged aerosol through said third device, expelling heat from said third device through the liquid thereof into a low temperature heat sink, forming a charged aerosol for the adiabatic compression device, passing said aerosol through said fourth device and returning the gas therefrom to the first aerosol conversion device.

9. The method in accordance with claim 8 wherein the gas velocity throughout the cycle is a constant.

10. The method in accordance with claim 8 wherein the cross-sectional areas of the gas inlet and outlet conversion spaces of each aerosol energy conversion device is adjusted so that the gas velocity throughout the cycle is a constant.

11. The method in accordance with claim 8 wherein the ratio of the heat input to the adiabatic work output is between 1 and 2.

12. A multiple loop power transduced according to claim 4 wherein more than two loops are employed and in which the residual heat contained in the liquid component coming from the isothermal conversion section of the one loop is piped to the high temperature heat exchanger of the next loop to provide the input heat for the said next loop, and the residual heat from the last loop is transferred by means of a heat exchanger at the lowest temperature to a lowest heat sink.

13. The method according to claim 8 wherein a plurality of heat energy to electrical energy conversion loops are employed and the heat is conveyed from one loop to another by means of the liquid component of the charged aerosol.

14. A power transducer according to claim 1 in which the gas is of low molecular weight to reduce frictional power loss.

15. A power transducer according to claim 1 in which the gas has a relative molecular weight of the order of 0.1 and a relative break-down strength of the order of 3 with respect to air.

16. A power transducer according to claim 1 in which the ratio of the length of the conversion space to the diameter of the dispensing end of the capillary tube is of the order of 1/10.

17. A power transducer according to claim 1 in which the droplet size is controlled and the aerosol vapor supercooled to improve the ratio of the electric break-down potential of the charged aerosol.

References Cited by the Examiner

UNITED STATES PATENTS

| | | | |
|---|---|---|---|
| 2,004,352 | 6/1935 | Simon | 310—5 |
| 2,302,185 | 11/1942 | Campbell | 317—3 X |
| 2,308,884 | 1/1943 | Lindenblad | 310—5 |
| 2,638,555 | 5/1953 | Marks | 310—5 X |
| 2,827,577 | 3/1958 | Kimberlin | 310—5 |

MILTON O. HIRSHFIELD, *Primary Examiner.*

DAVID X. SLINEY, *Assistant Examiner.*